United States Patent
Kim et al.

(10) Patent No.: US 9,942,183 B2
(45) Date of Patent: *Apr. 10, 2018

(54) PROCESSING CONNECTION REQUEST IN ONLINE SERVICE

(71) Applicant: EMPIRE TECHNOLOGY DEVELOPMENT LLC, Wilmington, DE (US)

(72) Inventors: Seungil Kim, Seoul (KR); Youngil Ko, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/084,879

(22) Filed: Mar. 30, 2016

(65) Prior Publication Data
US 2016/0212081 A1 Jul. 21, 2016

Related U.S. Application Data

(63) Continuation of application No. 13/701,324, filed as application No. PCT/US2012/045748 on Jul. 6, 2012, now Pat. No. 9,331,966.

(51) Int. Cl.
*G06Q 10/10* (2012.01)
*H04L 12/58* (2006.01)
(Continued)

(52) U.S. Cl.
CPC ............ *H04L 51/12* (2013.01); *H04L 12/586* (2013.01); *H04L 12/588* (2013.01); *H04L 51/32* (2013.01);
(Continued)

(58) Field of Classification Search
CPC . H04L 12/1895; H04L 12/586; H04L 12/588; H04L 67/22; H04L 67/306;
(Continued)

(56) References Cited

U.S. PATENT DOCUMENTS 7,949,611 B1 5/2011 Nielsen et al.
2004/0010602 A1 1/2004 Van Vleck et al.
(Continued)

OTHER PUBLICATIONS

"Myspace Friend Adder—Easy Adder," accessed at www.thetoolsmith.com, accessed on Mar. 29, 2012, pp. 1-2.
(Continued)

*Primary Examiner* — Barbara B Anyan
(74) *Attorney, Agent, or Firm* — Brundidge & Stanger, P.C.

(57) ABSTRACT

Disclosed is a system and method for processing a connection request in an online service by a server corresponding to the online service. A connection request message that originates from a personalized account for a first user is sent to a personalized account for a second user and a certain threshold of access to posts related to the personalized account for the first user is provided to the personalized account for the second user for a certain period of time. An access to the posts related to the personalized account for the first user is otherwise accorded to authorized contacts of the personalized account for the first user on the online service.

19 Claims, 6 Drawing Sheets

(51) Int. Cl.
*H04L 29/08* (2006.01)
*G06Q 50/00* (2012.01)
*G06Q 30/02* (2012.01)
*G06F 15/16* (2006.01)

(52) U.S. Cl.
CPC .......... *H04L 67/2814* (2013.01); *G06F 15/16* (2013.01); *G06Q 10/10* (2013.01); *G06Q 10/101* (2013.01); *G06Q 30/02* (2013.01); *G06Q 50/01* (2013.01)

(58) Field of Classification Search
CPC ...... G06Q 10/10; G06Q 10/101; G06Q 50/01; G06Q 30/02; G06F 15/16
See application file for complete search history.

(56) References Cited

U.S. PATENT DOCUMENTS

| | | |
|---|---|---|
| 2006/0184997 A1 | 8/2006 | La Rotanda et al. |
| 2006/0259760 A1* | 11/2006 | Ahluwalia ............. H04L 63/08 713/153 |
| 2007/0106627 A1* | 5/2007 | Srivastava ............ G06Q 10/10 706/20 |
| 2008/0082465 A1* | 4/2008 | Meijer .................. G06Q 10/00 706/12 |
| 2008/0104495 A1 | 5/2008 | Craig |
| 2009/0070334 A1 | 3/2009 | Callahan et al. |
| 2010/0257103 A1 | 10/2010 | Muller et al. |
| 2011/0004922 A1 | 1/2011 | Bono et al. |
| 2011/0023129 A1 | 1/2011 | Vemal et al. |
| 2011/0209192 A1* | 8/2011 | LeClerc Greer ........ G06F 21/32 726/1 |
| 2011/0219422 A1* | 9/2011 | Shen ...................... G06F 15/16 726/1 |
| 2011/0258316 A1* | 10/2011 | Rizk ..................... G06Q 30/02 709/225 |
| 2011/0321132 A1* | 12/2011 | Slingerland ........ H04N 21/4788 726/4 |
| 2011/0321147 A1 | 12/2011 | Chakra et al. |
| 2012/0042263 A1* | 2/2012 | Rapaport ............... G06Q 50/01 715/753 |
| 2012/0084349 A1* | 4/2012 | Lee ........................ G06Q 30/02 709/203 |
| 2012/0283855 A1* | 11/2012 | Hoffman ................ G01C 21/20 700/91 |
| 2013/0007148 A1* | 1/2013 | Olsen .................. G06Q 10/101 709/206 |
| 2013/0054481 A1* | 2/2013 | Upadhyaya ........... G06Q 50/01 705/319 |
| 2013/0125153 A1* | 5/2013 | Hilson ................... H04H 60/00 725/5 |
| 2013/0290202 A1* | 10/2013 | Nunnery ............... G06Q 50/01 705/319 |
| 2014/0058965 A1* | 2/2014 | Ryan ..................... G06Q 50/01 705/319 |

OTHER PUBLICATIONS

International Search Report and Written Opinion from International Application No. PCT/US2012/045748 dated Jul. 6, 2012.
Non-Final Rejection dated Nov. 19, 2014, in U.S. Appl. No. 13/701,324, Seungil Kim, filed Nov. 30, 2012.

* cited by examiner

PROCESSING CONNECTION REQUEST IN ONLINE SERVICE

CROSS-REFERENCE TO RELATED APPLICATIONS

This application is a Continuation Application under 35 U.S.C. § 120 of U.S. application Ser. No. 13/701,324, filed on Nov. 30, 2012, issued as U.S. Pat. No. 9,331,966 on May 3, 2016, which is a U.S. National Stage filing under 35 U.S.C. § 371 of International Application No. PCT/US12/45748, filed on Jul. 6, 2012. The disclosures of both the U.S. National Stage Application and the International Application are hereby incorporated herein by reference in their entireties.

BACKGROUND

Online services allow a user to send a connection request to a second user. If the second user accepts the connection request, the user who sent the connection request and the second user who accepted the request become authorized contacts relative to the online services.

SUMMARY

According to one example, a method for processing a connection request in an online service by a server corresponding to the online service is provided. A connection request message that originates from a personalized account for a first user is sent to a personalized account for a second user. A certain threshold of access to posts related to the personalized account for the first user is provided to the personalized account for the second user for a certain period of time. Access to the posts related to the personalized account for the first user is otherwise accorded to authorized contacts of the personalized account for the first user on the online service.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the detailed description that follows, embodiments are described as illustrations since various changes and modifications will become apparent to those skilled in the art from the following detailed description. The use of the same reference numbers in different figures indicates similar or identical items.

DETAILED DESCRIPTION

Figure 1:
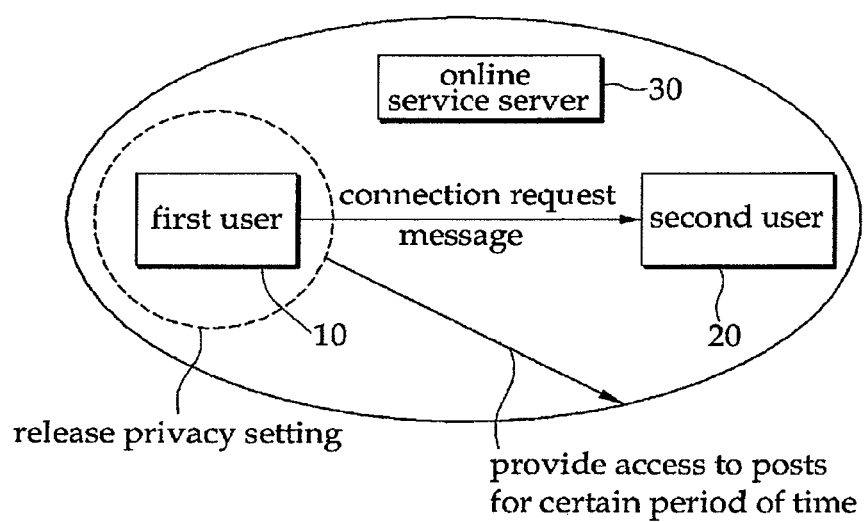
FIG. 1 is a schematic diagram showing an example of a system for sending a connection request message from a first user to a second user via an online service server regarding an online service, arranged in accordance with at least some embodiments described in the present disclosure.

According to one example, a method for processing a connection request in an online service by a server corresponding to the online service is provided. A connection request message that originates from a personalized account for a first user is sent to a personalized account for a second user. The connection request message may include a friend request message.

Accordingly, a certain threshold of access to posts related to the personalized account for the first user is provided to the personalized account for the second user for a certain period of time. The certain period of time may start when the connection request message is verified as having been received on the personalized account for the second user, when the posts related to the personalized account for the first user are verified as having been accessed on the personalized account for the second user, or when the connection request message is sent to the personalized account for the second user. Further, the certain period of time may extend from minutes to weeks.

Access to the posts related to the personalized account for the first user is otherwise accorded to authorized contacts of the personalized account for the first user on the online service.

It may be determined that the connection request message has not been accepted on the personalized account for the second user before the certain period of time has elapsed, and therefore the access to the certain threshold of posts related to the personalized account for the first user to the personalized account for the second user is discontinued upon lapse of the certain period of time.

In another example, a system for processing a connection request in an online service includes a processor-based device. The processor-based device is configured to send a connection request message that originates from a personalized account for a first user to a personalized account for a second user, and to then provide a certain threshold of access to posts related to the personalized account for the first user to the personalized account for the second user for a certain period of time. That is, after receiving the connection request but before accepting or authorizing the connection request, the personalized account of the second user is given a less-than-full level of access to posts related to the personalized account of the first user. Full or customized access to the posts related to the personalized account for the first user is otherwise accorded to authorized contacts of the personalized account for the first user on the online service.

The processor-based device may be further configured to determine that the connection request message has not been accepted on the personalized account for the second user before the certain period of time has elapsed, and to consequently discontinue providing the certain threshold of access to the posts related to the personalized account for the first user to the personalized account for the second user.

In yet another example, a computer-readable medium can store a plurality of computer-executable instructions executed by a processor-based device. The plurality of computer-executable instructions can include one or more computer-executable instructions for allowing the processor-based device to send a connection request message that originates from a personalized account for a first user to a personalized account for a second user, and one or more computer-executable instructions for allowing the processor-based device to provide a certain threshold of access to posts related to the personalized account for the first user to the personalized account for the second user for a certain period of time. Fuller or customized access to the posts related to the personalized account for the first user is otherwise accorded to authorized contacts of the personalized account for the first user on the online service.

The plurality of computer-executable instructions may further include one or more computer-executable instructions for allowing the processor-based device to determine that the connection request message has not been accepted on the personalized account for the second user before the certain period of time has elapsed, and one or more computer-executable instructions for allowing the processor-based device to discontinue providing the certain threshold of access to the posts related to the personalized account for the first user to the personalized account for the second user.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 is a schematic diagram showing an example of a system for sending a connection request message from a first user to a second user via an online service server regarding an online service, arranged in accordance with some of the embodiments described in the present disclosure. The system includes various components that are part of a first user 10, a second user 20, and an online service server 30. However, the system is not limited to such components, as obvious modifications may be made by eliminating at least one of the components, adding further components, substituting components, or even having various components performing roles accorded to other components in the following description. The components of the system may perform various operations, functions, or actions as illustrated by one or more of blocks 10, 20 and 30 in FIG. 1.

As shown in FIG. 1, a connection request message is sent from first user 10 to second user 20 via online service server 30 regarding an online service. In one example, the online service can include, but is not limited to, a social network service, a blog service, a micro-blog service, etc. The social network service is broadly described as any service that allows a user of the service to share personal information or content with other users of the service. First user 10 and second user 20 can create respective personalized accounts for the online service.

In one example, when first user 10 sends a connection request message to second user 20 in order that first user 10 and second user 20 may have fuller or customized access to posts related to the other's personalized account, the same or customized access to the posts related to the personalized account for first user 10 that is accorded to authorized contacts of first user 10 on the online service can be provided to second user 20. That is, the posts related to first user 10 can be released to second user 20, for a certain period of time after the connection request has been sent.

An authorized contact can characterize a particular relationship between users on the online service that is established when a user sends a connection request message to another user and the other user accepts the connection request message. The posts may include at least one of an image, a video, an audio file, a text message, a profile change, a status change, an indication of activity, a rating of a previously generated post, and the like. The posts related to the personalized account for first user 10 may include, for example, the posts uploaded by first user 10, comments written by first user 10 with regard to other user's posts, the posts that were generated on other user's personalized page and linked to the personalized page of first user 10, and indications generated by online service server 30 such as a status change, a profile change, or an indication of activity of first user 10 or authorized contacts, and the like. A rating of one of such posts may include an indication of a favorable reception by a viewer of a respective post.

In one example, releasing of the posts related to first user 10 for access by second user 20 lasts for a certain period of time. The certain period of time can be defined in many ways. By way of example, the certain period of time can be defined as a period of time that starts when second user 20 receives the connection request message, a period of time that starts when second user 20 starts to access one or more posts that are originally revealed to the first user's authorized contacts, or a period of time that starts when first user 10 sends the connection request message to second user 20, as will be further discussed later.

Referring to FIG. 1, second user 20, who received the connection request message from first user 10, can be authorized to access the posts related to first user 10 for the certain period of time. Among other purposes, this initial authorization of access may allow second user 20 to get more detailed information about first user 10 who sent the connection request message so that second user 20 may determine whether or not to accept the connection request message from first user 10.

Figure 2:
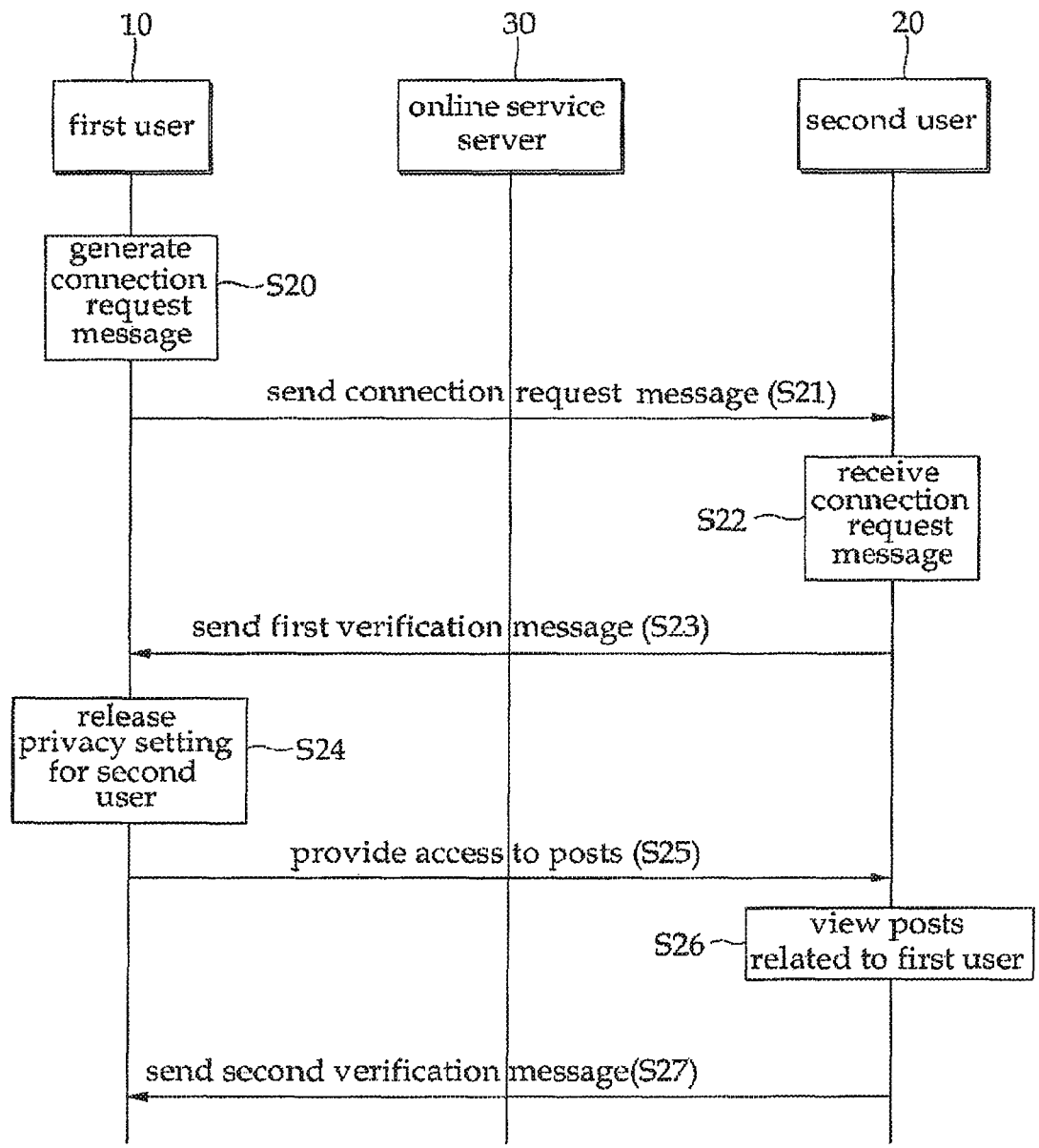
FIG. 2 is a schematic diagram showing an example of a method for processing a connection request message by an online service server, arranged in accordance with at least some embodiments described in the present disclosure.

FIG. 2 is a schematic diagram showing an example of a method for processing a connection request message by an online service server 30, arranged in accordance with some of the embodiments described in the present disclosure. FIG. 2 also shows how messages are processed and transmitted between first user 10 and second user 20 through online service server 30. The processing flow includes sub-processes executed by various components that are part of first user 10, second user 20, and online service server 30. However, the processing flow is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow may include various operations, functions, or actions as illustrated by one or more of blocks S20, S22, S24, and S26, and one or more of arrows S21, S23, S25, and S27. Processing may begin at block S20.

Referring to FIG. 2, a connection request message can be generated from the personalized account for first user 10 at (S20). The processing continues from (S20) to (S21). The generated connection request message is sent to the personalized account for second user 20 through online service server 30 at (S21). The processing continues from (S21) to (S22). When the connection request message is received in the personalized account for second user 20 at (S22), the processing continues from (S22) to (S23). A first verification message can be generated from the personalized account for second user 20 and is sent from second user 20 to first user 10 via online service server 30 at (S23). The first verification message can indicate that the connection request message is received by second user 20. By receiving the first verification message, first user 10 can verify that second user 20 has received the connection request message. The processing continues from (S23) to (S24). Then, first user 10 releases a privacy setting to second user 20 for a certain period of time at (S24). The processing continues from (S24) to (S25). The privacy setting provides second user 20 with access to the posts related to first user 10 at (S25) that is otherwise accorded to authorized contacts of first user 10 on the online service. The processing continues from (S25) to (S26). Second user 20 can access the posts related to first user 10 for the certain period of time at (S26). The processing continues from (S26) to (S27). When second user 20 starts to access the posts related to first user 10, a second verification message can be sent from second user 20 to first user 10 at (S27).

As a result, and as one of multiple consequences, second user 20 can determine whether to accept the connection request message from first user 10 based on the information acquired from accessing the posts related to first user 10. As described above, a less-than-full level of access to the posts related to the personalized account for first user 10 can be provided to second user 20. That is, the access to the posts related to the personalized account for first user 10 can be provided for a certain period of time. The certain period of time can be defined to protect the privacy of first user 10 and it can be implemented in various manners as will be further illustrated and described hereinafter.

In one example, the certain period of time can start when the connection request message is verified as having been received on the personalized account for second user 20 (for example, from when the first verification message is sent (S23) in FIG. 2). If the connection request message is not accepted before the lapse of a certain amount of time after the connection request message is verified as having been received on the personalized account for second user 20, the right to access the posts would be revoked to protect the privacy of first user 10. In this case, for example, the certain period of time may be a day (24 hours), or less or more than a day.

In another example, the certain period of time can start when the posts related to the personalized account for first user 10 are verified as having been accessed on the personalized account for second user 20 (for example, from when the second verification message is sent (S27) in FIG. 2). If the connection request message is not accepted before the lapse of a certain amount of time after the posts related to the personalized account for first user 10 are verified as having been accessed on the personalized account for second user 20, the right to access the posts would be revoked to protect the privacy of first user 10. In this case, for example, the certain period of time may extend from several minutes to tens of minutes.

In another example, the certain period of time can start when the connection request message is sent to the personalized account for second user 20 (for example, from when the connection request message is sent (S21) in FIG. 2). If the connection request message was sent to second user 20 for a period of time beyond the certain amount of time, but the connection request message has not still been accepted, the right to access the posts would be revoked to protect the privacy of first user 10. In this case, for example, the certain period of time may extend from a week to several weeks.

Figure 3:
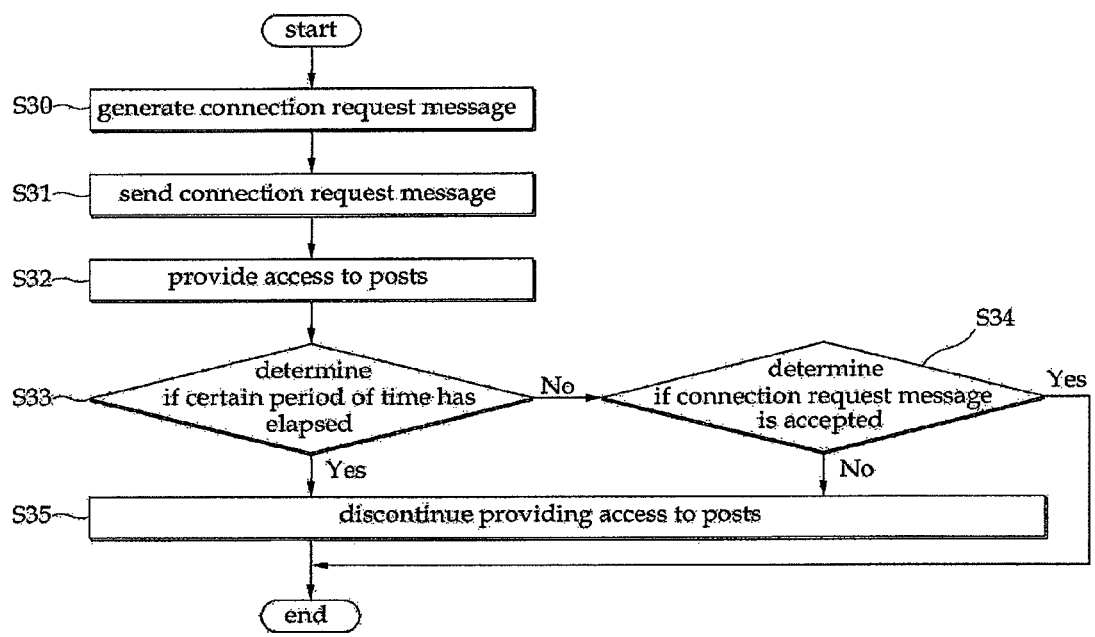
FIG. 3 is a flow chart illustrating an example of a processing flow for processing a connection request message, arranged in accordance with at least some embodiments described in the present disclosure.

FIG. 3 is a flow chart illustrating an example of a processing flow for processing a connection request message, arranged in accordance with at least some embodiments described in the present disclosure. The processing flow includes sub-processes executed by various components that are part of first user 10, second user 20, and online service server 30. However, the processing flow is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow may include various operations, functions, or actions as illustrated by one or more of blocks S30, S31, S32, S33, S34, and S35. The processing flow may start at S30.

As shown in FIG. 3, a connection request message is generated from a personalized account for first user 10 at (S30). The processing flow can proceed from (S30) to (S31). The connection request message is sent to second user 20 at (S31) via online service server 30. The processing flow can proceed from (S31) to (S32). Then, first user 10 provides second user 20 an access to the posts related to first user 10 that are otherwise accorded to authorized contacts of first user 10 at (S32). The processing flow can proceed from (S32) to (S33). After starting the provision of the posts related to first user 10 to second user 20, online service server 30 determines if the certain period of time has elapsed (S33). The processing flow can proceed from (S33) to (S34). If it is determined that the certain period of time has not elapsed, the procedure proceeds to determine if the connection request message is accepted by second user 20 at (S34). If it is determined that the connection request message is accepted by second user 20 at (S34), the processing flow ends. Otherwise, the processing flow can proceed from (S34) to (S35). If it is determined that the connection request message is not accepted by second user 20 at (S34), the processing flow proceeds to discontinue providing an access to the posts related to first user 10 to second user 20 at (S35), and therefore second user 20 can no longer access the posts related to first user 10. The processing flow can also proceed from (S33) to (S35). If it is determined that the certain period of time has elapsed at (S33), the processing flow proceeds directly to discontinue providing an access to posts related to first user 10 to second user 20 at (S35).

Figure 4A:
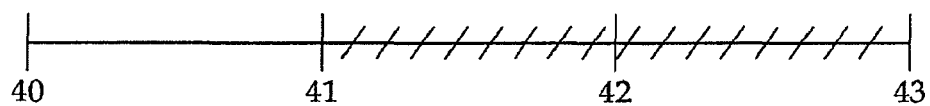
FIGS. 4A through 4C show timelines, each of which illustrates an example of a certain period of time to provide posts related to a first user to a second user, arranged in accordance with at least some embodiments described in the present disclosure.
Figure 4B:
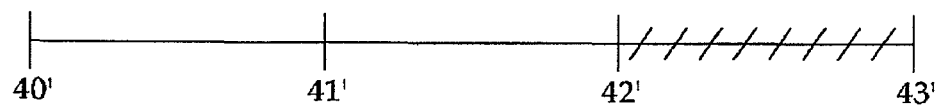
Figure 4C:
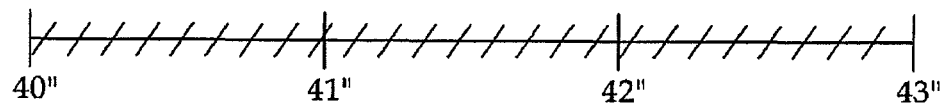

FIGS. 4A through 4C are timelines, each of which showing an example of a certain period of time to provide posts related to first user 10 to second user 20, arranged in accordance with at least some embodiments described in the present disclosure. In FIGS. 4A through 4C, '40, 40' and 40'" respectively refer to a time when the connection request message is sent to the personalized account for second user 20, '41, 41' and 41'" respectively refer to a time when the connection request message is verified as having been received on the personalized account for second user 20, '42, 42' and 42''' respectively refer to a time when the posts related to the personalized account for first user 10 are verified as having been accessed on the personalized account for second user 20, and '43, 43' and 43''' respectively refer to a time when the provision of posts related to first user 10 to second user 20 is discontinued.

FIG. 4A illustrates an example of a timeline that the certain period of time to provide posts related to first user 10 to second user 20 starts when the connection request message is verified as having been received on the personalized account for second user 20 (i.e., at 41 of the timeline shown in FIG. 4A). If the connection request message is not accepted before the lapse of a certain amount of time after the connection request message is verified as having been received on the personalized account for second user 20, the provision of the posts related to first user 10 to second user 20 is discontinued at 43 of the timeline to protect the privacy of first user 10.

FIG. 4B illustrates another example of a timeline that the certain period of time to provide posts related to first user 10 to second user 20 starts when the posts related to first user 10 are verified as having been accessed on the personalized account for second user 20 (i.e., at 42' of the timeline shown in FIG. 4B). If the connection request message is not accepted before the lapse of a certain amount of time after the posts related to first user 10 are verified as having been accessed on the personalized account for second user 20, the provision of the posts related to first user 10 to second user 20 is discontinued at 43' of the timeline to protect the privacy of first user 10.

FIG. 4C illustrates another example of a timeline that the certain period of time to provide posts related to first user 10 to second user 20 starts when the connection request message is sent to the personalized account for second user 20 (i.e., at 40" of the timeline shown in FIG. 4C). If the connection request message was sent to second user 20 for a period of time beyond the certain amount of time, but the connection request message has not still been accepted, the provision of the posts related to first user 10 is discontinued at 43" of the timeline to protect the privacy of first user 10.

Comparing FIGS. 4A through 4C, as indicated by deviant crease lines in each timeline, the certain period of time can have the shortest period of time from '42" to '43" in FIG. 4B and the certain period of time can have the longest period of time from '40''' to '43''' in FIG. 4C. In some examples, as described above, the certain period of time from '41' to '43' may be a day (24 hours), or less or more than a day in FIG. 4A, the certain period of time from '42" to '43" may extend from several minutes to tens of minutes in FIG. 4B, and the certain period of time from '40''' to '43''' may extend from a week to several weeks in FIG. 4C.

Figure 5:
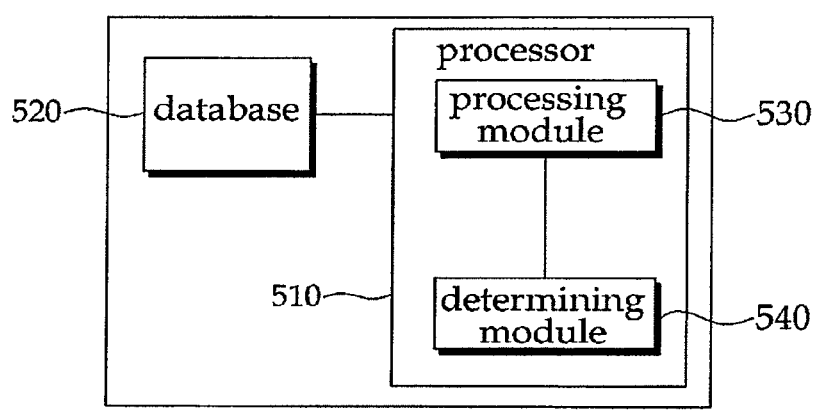
FIG. 5 is a schematic diagram of an example of an online service server, arranged in accordance with at least some embodiments described in the present disclosure.

FIG. 5 is a schematic diagram of an example of online service server 30, arranged in accordance with some of the embodiments described in the present disclosure. Online service server 30 may include a processor 510 and a database 520. Processor 510 may include a processing module 530 and a determining module 540.

In one example, processing module 530 can be configured to send a connection request message that originates from a personalized account for first user 10 to a personalized account for second user 20, and to provide a certain threshold of access to posts related to the personalized account for first user 10 to the personalized account for second user 20 for a certain period of time. Processing module 530 can be further configured to discontinue providing of the certain threshold of access to the posts related to the personalized account for first user 10 to the personalized account for second user 20.

Determining module 540 can be configured to determine if the certain period of time has elapsed. If determining module 540 determines that the certain period of time has not elapsed, determining module 540 can further determine if the connection request message has been accepted by second user 20. If determining module 540 determines that the connection request message has not been accepted by second user 20, processing module 530 discontinues providing access to the posts related to first user 10 to second user 20. If determining module 540 determines that the certain period of time has elapsed without the connection request message having been accepted, processing module 530 discontinues providing an access to the posts related to first user 10 to second user 20.

Database 520 may be configured to store information which is required to manage the online service. For example, database 520 can store, but is not limited to, user information, posts uploaded by users, a listing of authorized contacts of users and/or policies defined by a service provider of the online service or users.

Figure 6:
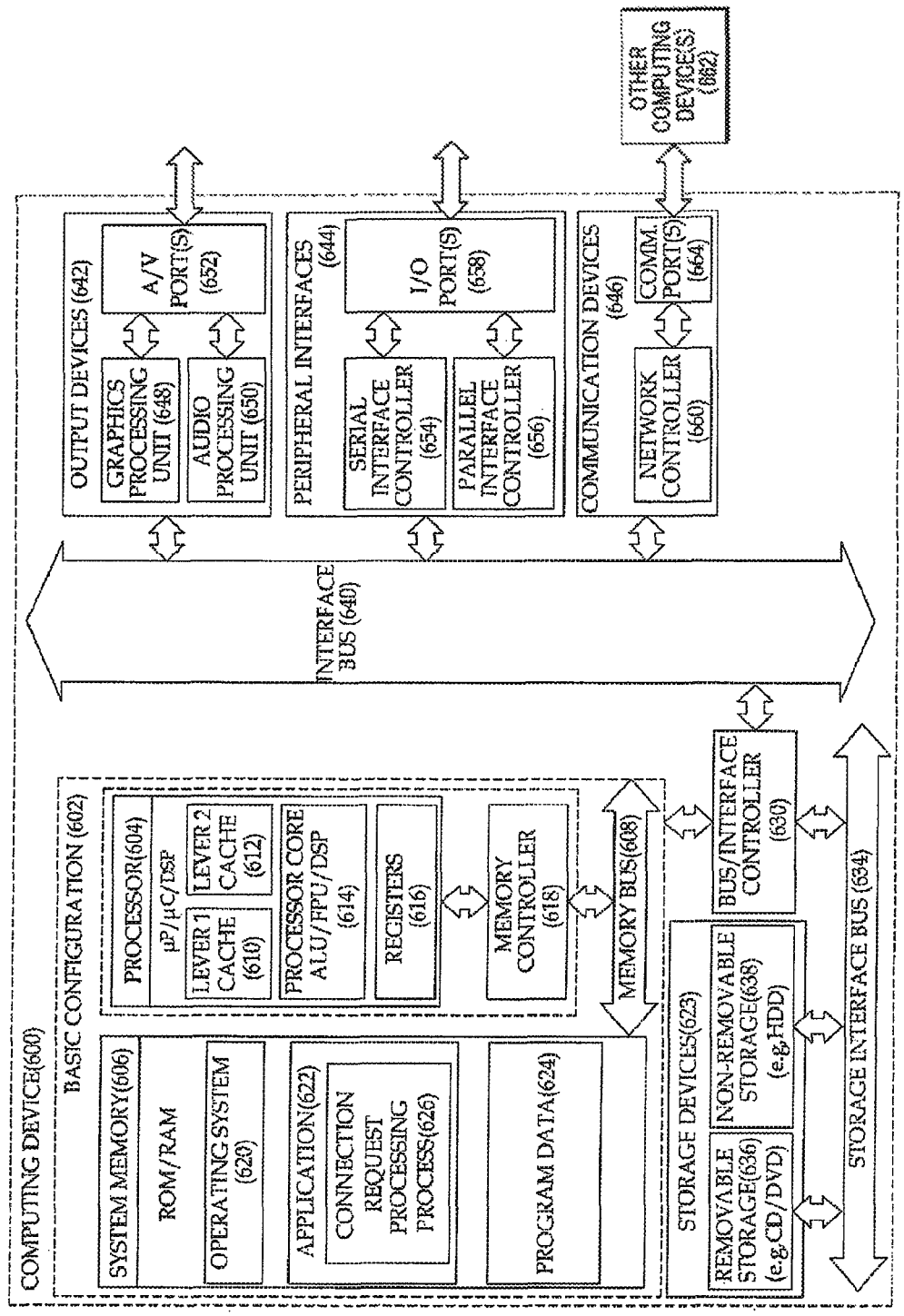
FIG. 6 is a block diagram illustrating an example computing device that is configured for processing a connection request in an online service, arranged in accordance with at least some embodiments described in the present disclosure.

FIG. 6 is a block diagram illustrating an example computing device 600 that is configured for processing a connection request in an online service, arranged in accordance with at least some embodiments described in the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a connection request processing process 626 (e.g., the process for processing connection request for an online service described above in conjunction with the system of FIG. 1 and/or the process for processing connection request for an online service described above in conjunction with the schematic diagram of FIG. 2 and the flow chart of FIG. 3) that is arranged to process connection request for an online service. Program data 624 may include any data that may be useful for processing connection request for an online service, as is described herein. In some embodiments, application 622 may be arranged to operate with program data 624 on operating system 620 such that a certain threshold of access to posts related to the personalized account for first user 10 is provided to the personalized account for second user 20 for a certain period of time. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 623 via a storage interface bus 634. Data storage devices 623 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

A storage medium device having computer readable instructions embodied therewith is provided. The computer readable instructions, when executed on computing device 600, cause computing device 600 to perform the method to process a connection request in an online service, as is described herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method to process a connection request in an online service, the method comprising:
   receiving, by one or more servers of the online service, a connection request message from a first user using a first computing device, wherein the connection request message includes a connection request to connect to a second user in the online service;
   sending, by the one or more servers of the online service, the connection request message to the second user using a second computing device;
   providing, to the second user by the one or more servers of the online service, access to one or more posts related to the first user, wherein the one or more posts related to the first user are accessible by one or more authorized contacts of the first user;
   determining, by the one or more servers of the online service, if the connection request has been accepted by the second user, wherein the second user becomes one of the one or more authorized contacts of the first user by acceptance of the connection request;
   in response to a determination that the connection request has not been accepted by the second user, determining, by the one or more servers of the online service, if a certain period of time has elapsed subsequent to the providing the access to the one or more posts related to the first user to the second user,
   wherein the determining if the certain period of time has elapsed includes determining whether a certain period of time that starts when the connection request message is sent to the second user has elapsed; and
   in response to a determination that the certain period of time has elapsed subsequent to the providing the access to the one or more posts related to the first user to the second user, discontinuing, by the one or more servers of the online service, the providing the access to the one or more posts related to the first user to the second user.

2. The method of claim 1, wherein the online service includes a social network service.

3. The method of claim 1, wherein the receiving the connection request message includes receiving a friend request message.

4. The method of claim 1, wherein the determining if the certain period of time has elapsed includes determining whether a certain period of time that extends from minutes to weeks has elapsed.

5. The method of claim 1, wherein the providing access to the one or more posts related to the first user includes providing access to one or more images, one or more videos, one or more audio files, or one or more text messages.

6. The method of claim 1, wherein the providing access to the one or more posts related to the first user includes providing access to a profile change, a status change, a rating, an indication of an activity, or a comment.

7. The method of claim 1, wherein the providing the access to the one or more posts related to the first user includes providing a customized access for the second user.

8. The method of claim 1, further comprising:
sending, by the one or more servers of the online service, a verification message to the first user indicating that at least one of the one or more posts related to the first user is accessed by the second user.

9. The method of claim 1, wherein the providing the access to the one or more posts comprises:
providing, to the second user and in response to the sending of the connection request message, the access to the one or more posts related to the first user for the certain period of time.

10. A method to process a connection request in an online service, the method comprising:
receiving, by one or more servers of the online service, a connection request message from a first user using a first computing device, wherein the connection request message includes a connection request to connect to a second user using a second computing device in the online service;
sending, by the one or more servers of the online service, the connection request message to the second user;
providing, to the second user by the one or more servers of the online service, access to one or more posts related to the first user, wherein the one or more posts related to the first user are accessible by one or more authorized contacts of the first user;
determining, by the one or more servers of the online service, if the connection request has been accepted by the second user, wherein the second user becomes one of the one or more authorized contacts of the first user by acceptance of the connection request;
in response to a determination that the connection request has not been accepted by the second user, determining, by the one or more servers of the online service, if a certain period of time has elapsed subsequent to the providing the access to the one or more posts related to the first user to the second user,
wherein the determining if the certain period of time has elapsed includes determining whether a certain period of time that starts when at least one of the one or more posts related to the first user is accessed by the second user has elapsed; and
in response to a determination that the certain period of time has elapsed subsequent to the providing the access to the one or more posts related to the first user to the second user, discontinuing, by the one or more servers of the online service, the providing the access to the one or more posts related to the first user to the second user.

11. A system to process a connection request in an online service, the system comprising:
a processor, wherein the processor is configured to:
identify a connection request message from a first user of the online service, wherein the connection request message includes a connection request to connect to a second user of the online service, and wherein the first user is a user of a first computing device and the second user is a user of a second computing device;
send the connection request message to the second user;
allow the second user to access one or more posts related to the first user, wherein one or more authorized contacts of the first user are allowed to access the one or more posts related to the first user;
determine if the connection request has been accepted by the second user, wherein the second user becomes one of the one or more authorized contacts of the first user by acceptance of the connection request;
in response to a determination that the connection request has not been accepted by the second user, determine if a certain period of time has elapsed subsequent to the allowance of the second user to access the one or more posts related to the first user, wherein the certain period of time starts when the connection request message is sent to the second user; and
in response to a determination that the certain period of time has elapsed subsequent to the allowance of the second user to access the one or more posts related to the first user, prevent access, by the second user, to the one or more posts related to the first user.

12. The system of claim 11, wherein the processor is further configured to:
send the first user a verification message to indicate that the connection request message is received by the second user.

13. The system of claim 11, wherein the processor is further configured to:
send the first user a verification message to indicate that at least one of the one or more posts related to the first user is accessed by the second user.

14. The system of claim 11, wherein the processor is configured to:
allow, in response to the connection request message being sent, the second user to access the one or more posts related to the first user for the certain period of time.

15. A system to process a connection request in an online service, the system comprising:
a processor, wherein the processor is configured to:
identify a connection request message from a first user of the online service, wherein the connection request message includes a connection request to connect to a second user of the online service, wherein the first user is a user of a first computing device and the second user is a user of a second computing device;
send the connection request message to the second user;
allow the second user to access one or more posts related to the first user, wherein one or more authorized contacts of the first user are allowed to access the one or more posts related to the first user;
determine if the connection request has been accepted by the second user, wherein the second user becomes one of the one or more authorized contacts of the first user by acceptance of the connection request;

in response to a determination that the connection request has not been accepted by the second user, determine if a certain period of time has elapsed subsequent to the allowance of the second user to access the one or more posts related to the first user, wherein the certain period of time starts when at least one of the one or more posts related to the first user is accessed by the second user; and in response to a determination that the certain period of time has elapsed subsequent to the allowance of the second user to access the one or more posts related to the first user, prevent access, by the second user, to the one or more posts related to the first user.

16. A non-transitory computer-readable memory having stored thereon a plurality of computer-executable instructions, that in response to execution, cause one or more processors to perform or cause to be performed operations comprising:

identify a connection request message from a first user of an online service, wherein the connection request message includes a connection request to connect to a second user of the online service, wherein the first user is a user of a first computing device and the second user is a user of a second computing device;

send the connection request message to the second user;

in response to the connection request message being sent to the second user, provide access to one or more posts related to the first user to the second user for a certain period of time, wherein the one or more posts related to the first user are accessible by one or more authorized contacts of the first user;

determine if the connection request has been accepted by the second user, wherein the second user becomes one of the one or more authorized contacts of the first user by acceptance of the connection request;

in response to a determination that the connection request has not been accepted by the second user, determine if the certain period of time has elapsed subsequent to the access to the one or more posts related to the first user being provided to the second user; and in response to a determination that the certain period of time has elapsed subsequent to the access to the one or more posts related to the first user being provided to the second user, discontinue the access to the one or more posts related to the first user from being provided to the second user, wherein the certain period of time starts from a time at least one of when the connection request message is sent to the second user or when at least one of the one or more posts related to the first user is accessed by the second user.

17. The non-transitory computer-readable memory of claim 16, wherein the online service includes a social network service or a blog service.

18. The non-transitory computer-readable memory of claim 16, wherein the one or more posts related to the first user include one or more images, one or more videos, one or more audio files, one or more text messages, a profile change, a status change, a rating, an indication of an activity, or a comment.

19. The non-transitory computer-readable memory of claim 16, wherein to provide access to the one or more posts related to the first user to the second user, the computer-executable instructions include at least one computer-executable instruction, which in response to execution, cause the one or more processors to perform or cause to be performed at least one operation that includes:

provide, to the second user, a less than full level of access to the one or more posts related to the first user, wherein the less than full level of access is customized for the second user.

\* \* \* \* \*